(12) United States Patent
Ngoly et al.

(10) Patent No.: US 11,067,004 B2
(45) Date of Patent: Jul. 20, 2021

(54) GAS TURBINE ENGINE FLUID SYSTEM WITH ACCUMULATOR AND HYDRAULIC ACCESSORY

(71) Applicant: PRATT & WHITNEY CANADA CORP., Longueuil (CA)

(72) Inventors: Nicholas Ngoly, Saint-Lambert (CA); Simon Hartropp, Pointe Claire (CA); Andrew Walz, York (CA); Roger Lachance, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 361 days.

(21) Appl. No.: 15/937,234

(22) Filed: Mar. 27, 2018

(65) Prior Publication Data

US 2019/0301479 A1 Oct. 3, 2019

(51) Int. Cl.
*F02C 7/32* (2006.01)
*F02C 7/22* (2006.01)
*F02C 7/06* (2006.01)

(52) U.S. Cl.
CPC .................. *F02C 7/32* (2013.01); *F02C 7/06* (2013.01); *F02C 7/22* (2013.01)

(58) Field of Classification Search
CPC ...... F02C 7/06; F02C 7/32; F02C 7/22; F04D 27/0215; F15B 1/04; F15B 1/08; F15B 1/024; F15B 2211/61; F15B 2211/212; F15B 2211/7053; F15B 2211/625; F15B 2201/411; F15B 2201/20; F15B 2201/00; F15B 7/00; F05D 2220/32; F05D 2270/64
See application file for complete search history.

(56) References Cited

U.S. PATENT DOCUMENTS

| 3,309,868 | A | * | 3/1967 | Downing | ................ B64C 27/12 60/791 |
| 4,717,000 | A | | 1/1988 | Waddington et al. | |
| RE33,270 | E | * | 7/1990 | Beck | .................. F02D 41/3836 123/446 |
| 8,387,386 | B2 | | 3/2013 | Schmeltz | |
| 8,978,356 | B2 | | 3/2015 | Burgess | |
| 9,874,231 | B2 | | 1/2018 | Hare | |
| 2015/0204356 | A1 | * | 7/2015 | Krittian | .................. F15B 1/027 60/414 |
| 2015/0275931 | A1 | * | 10/2015 | Schlemmer | ............. F15B 11/08 60/413 |

(Continued)

FOREIGN PATENT DOCUMENTS

WO 2015200794 12/2015

*Primary Examiner* — William H Rodriguez
(74) *Attorney, Agent, or Firm* — Norton Rose Fulbright Canada LLP

(57) ABSTRACT

A fluid system for a gas turbine engine includes a first supply line, a hydraulic accessory actuable by a fluid, and a second supply line fluidly connected the hydraulic accessory and to the first supply line upstream of the component. An accumulator is fluidly connected to the second supply line upstream of the hydraulic accessory. The accumulator is operable to fill a reservoir with the fluid from the first supply line via the second supply line, and to deliver the fluid to the hydraulic accessory via the second supply line. The first supply line may be a fuel or lubricant main supply line of the engine. A method of actuating a hydraulic accessory is also disclosed.

14 Claims, 2 Drawing Sheets

(56) References Cited

U.S. PATENT DOCUMENTS

| | | | | |
|---|---|---|---|---|
| 2016/0123354 A1* | 5/2016 | Morita | F15B 11/08 | |
| | | | 60/327 | |
| 2016/0169144 A1* | 6/2016 | Surnilla | F02D 35/027 | |
| | | | 123/435 | |
| 2016/0169147 A1* | 6/2016 | Surnilla | F02D 41/2467 | |
| | | | 123/299 | |
| 2016/0363104 A1* | 12/2016 | Sanborn | F02D 41/3094 | |
| 2016/0377015 A1* | 12/2016 | Pursifull | F02D 41/3854 | |
| | | | 701/103 | |
| 2016/0377016 A1* | 12/2016 | Ulrey | F02M 55/025 | |
| | | | 701/103 | |
| 2016/0377017 A1* | 12/2016 | Basmaji | F02D 41/3809 | |
| | | | 701/103 | |
| 2016/0377018 A1* | 12/2016 | Sanborn | F02M 63/0285 | |
| | | | 123/457 | |
| 2016/0377019 A1* | 12/2016 | Russ | F02M 63/029 | |
| | | | 123/486 | |
| 2017/0022917 A1* | 1/2017 | Thomas | F02D 41/3094 | |
| 2017/0022926 A1* | 1/2017 | Sanborn | F02M 55/025 | |
| 2017/0022927 A1* | 1/2017 | Sanborn | F02D 41/3845 | |
| 2017/0204803 A1* | 7/2017 | Pursifull | F02D 41/123 | |
| 2018/0066598 A1* | 3/2018 | Dusa | F02D 41/3809 | |
| 2018/0149107 A1* | 5/2018 | Morris | F02M 57/005 | |
| 2019/0186106 A1* | 6/2019 | Ogawa | F15B 21/044 | |
| 2019/0193704 A1* | 6/2019 | Zell | F16K 15/026 | |
| 2019/0203746 A1* | 7/2019 | Balboni | E02F 9/2267 | |
| 2019/0338720 A1* | 11/2019 | Banker | F02M 63/0285 | |
| 2019/0368449 A1* | 12/2019 | Klein | F02D 41/3845 | |
| 2020/0123737 A1* | 4/2020 | Kang, II | E02F 9/2207 | |

* cited by examiner

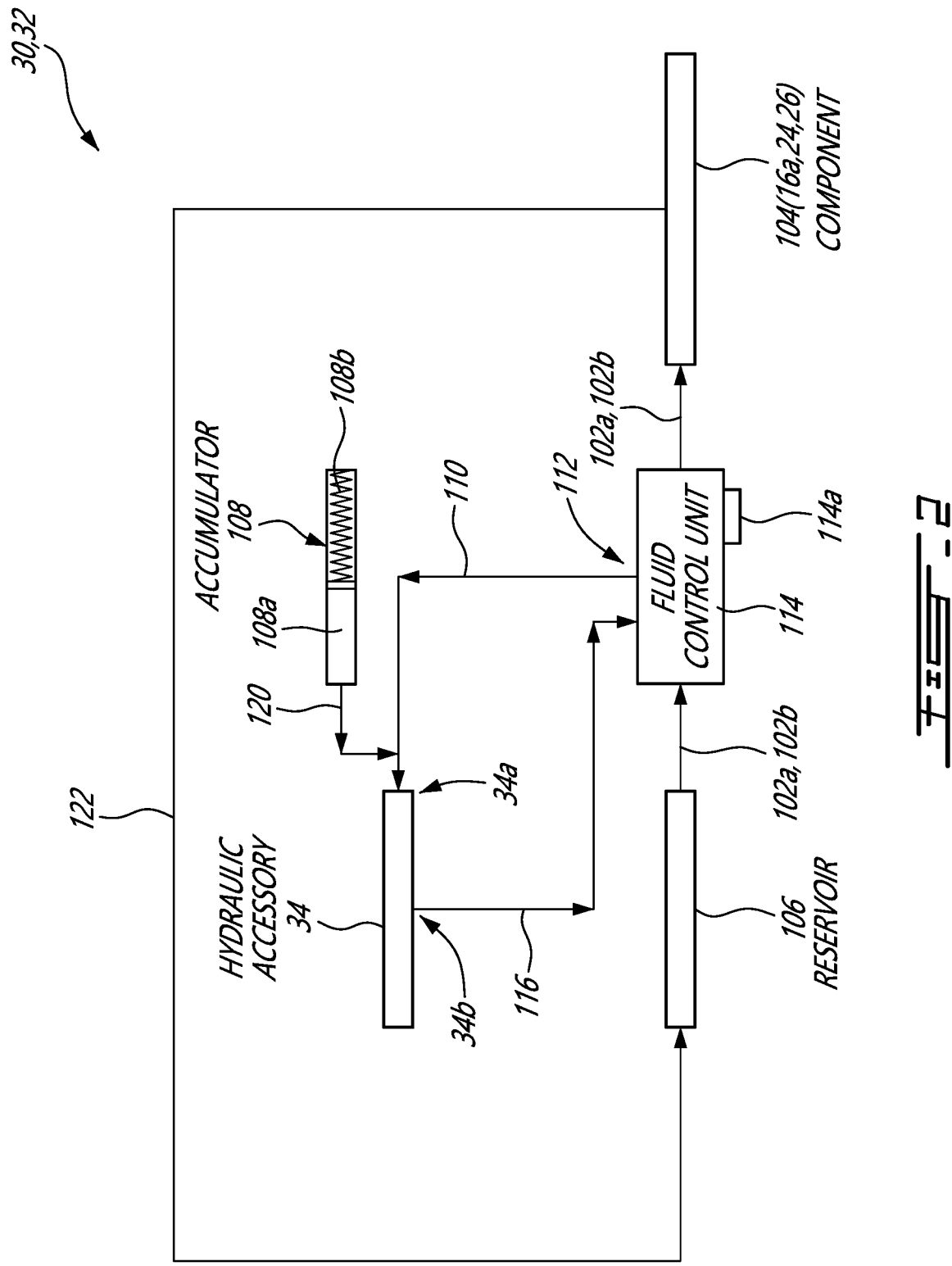

GAS TURBINE ENGINE FLUID SYSTEM WITH ACCUMULATOR AND HYDRAULIC ACCESSORY

TECHNICAL FIELD

The application relates generally to combustion engines such as gas turbine engines and, more particularly, to fluid systems of such engines.

BACKGROUND OF THE ART

Fluid systems of combustion engines typically include a fuel distribution system with a main fuel supply line delivering fuel from one or more fuel reservoir(s) to the combustion chamber(s) of the engine and a lubricant distribution system with a main lubricant supply line delivering lubricant from one or more lubricant reservoir(s) to components of the engine requiring lubrication, such as bearing cavities and gearboxes. Some engines, such as for example some types of gas turbine engines, include one or more hydraulically actuated accessory(ies) which may be connected to the fuel or lubricant supply lines and which may use the pressure of the fluid circulating within the supply line for its operation. However, in some circumstances, operation of the accessory suddenly reduces the pressure within the fluid system. Such a reduction in the pressure might impair performance and/or capability of the gas turbine engine.

SUMMARY

In one aspect, there is provided a fluid system for a combustion engine, comprising: a first supply line configured for supplying a fluid to a component of the engine; a hydraulic accessory actuable by the fluid; a second supply line fluidly connecting an inlet of the hydraulic accessory to the first supply line, the second supply line connected to the first supply line upstream of the component; and an accumulator including a reservoir having a volume varying between a minimum and a maximum volume and an actuation mechanism biasing the reservoir toward the minimum volume, the reservoir in selective fluid communication with the second supply line upstream of the inlet of the hydraulic accessory.

In another aspect, there is provided a gas turbine engine, comprising: a fuel circulation system including a fuel supply line configured to supply fuel to fuel nozzles of the gas turbine engine for combustion; a lubricant circulation system including a lubricant supply line configured to supply lubricant to components of the engine; a hydraulic accessory; an accessory supply line fluidly connecting an inlet of the hydraulic accessory to one of the fuel and lubricant supply lines; and an accumulator including a reservoir having a volume varying between a minimum and a maximum volume and an actuation mechanism biasing the reservoir toward the minimum volume, the reservoir in selective fluid communication with the accessory supply line upstream of the inlet of the hydraulic accessory.

In a further aspect, there is provided a method of actuating a hydraulic accessory of a combustion engine, the method comprising: flowing a fluid in a first fluid supply line feeding a component of the combustion engine; flowing a portion of the fluid circulating in the first supply line in a second supply line configured to feed the hydraulic accessory and communicating with the first fluid supply line upstream of the component; extracting a quantity of the portion of the fluid flowing in the second supply line and storing the extracted quantity of the fluid; and hydraulically actuating the hydraulic accessory by releasing at least part of the extracted quantity of the fluid from storage into the second supply line.

DESCRIPTION OF THE DRAWINGS

Reference is now made to the accompanying figures in which:

FIG. 2 is a schematic view of a fluid system in accordance with one embodiment, which may be used in an engine such as shown in FIG. 1.

DETAILED DESCRIPTION

Figure 1:
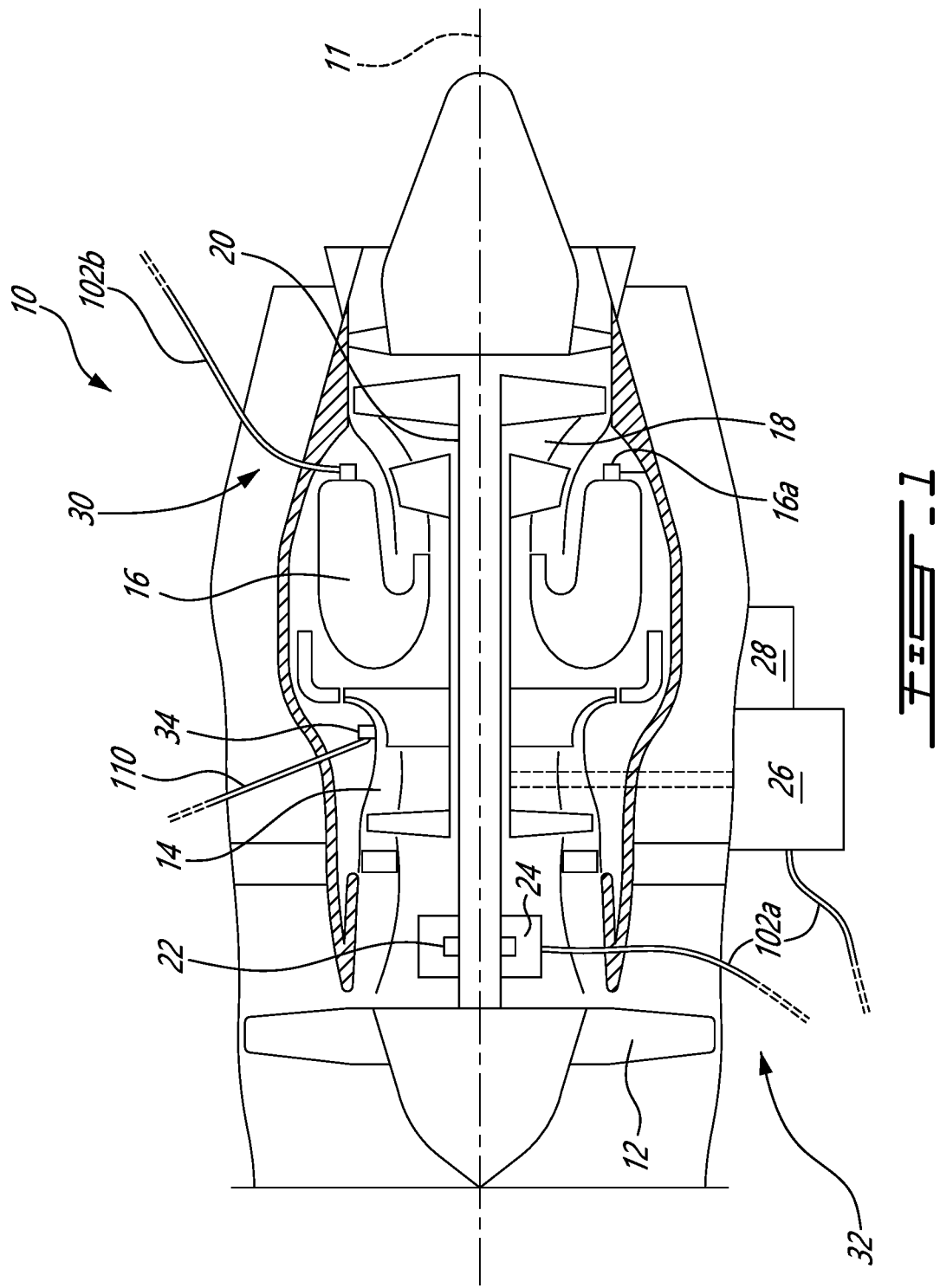
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are in rotation about a central axis 11 of the gas turbine engine 10.

Although the gas turbine engine 10 is shown as a turbofan engine, it is understood that the gas turbine engine 10 may have any other suitable configuration, including, but not limited to, a turboprop engine and a turboshaft engine. Moreover, the engine 10 may be any other suitable type of combustion engine, including, but not limited to, an intermittent internal combustion engine. It is also understood that engine 10 may be a main engine used for propulsion of a vehicle, or any other type of engine such as an auxiliary power unit.

The engine 10 includes a number of components requiring lubrication, including, but not limited to, bearings 22 (only one of which is shown) supporting the shaft(s) 20 of the engine, one or more gearbox 26 (shown here as an accessory gearbox drivingly engaged to a mechanically driven accessory 28), etc. The bearings 22 are located within suitable bearing cavities 24 such as to contain the lubricant delivered the bearings 22, and the gearbox 28 includes a suitable casing enclosing the gears and other elements of the gearbox and also containing the lubricant delivered to the elements of the gearbox 28. The engine 10 includes a lubricant circulation system 32 for providing lubricant to the components requiring lubrication. The lubricant circulation system 32 includes a main lubricant supply line 102a configured for supplying lubricant to components of the engine 10. The components may be, for instance, the bearing cavity 24 and/or the gearbox cavity 28. It is understood that other components of the engine 10 may also require lubricant and that the bearing 22 and gearbox 26 shown are exemplary only.

The engine 10 also includes fuel nozzles 16a providing fuel to the combustor 16 for ignition, and a fuel circulation system 30 including a main fuel supply line 102b configured for supplying fuel to the fuel nozzles 16a.

The engine 10 further includes a hydraulic accessory 34 that is hydraulically actuable by a fluid of the engine and is accordingly connected to a fluid system of the engine; in a particular embodiment, the fluid system is either the fuel circulation system 30 or the lubricant circulation system 32, such that the hydraulic accessory 34 is actuated by the fluid pressure of either the lubricant or the fuel of the engine 10.

In the embodiment shown, the hydraulic accessory 34 is a surge control valve of the compressor 14, and is actuable by the fluid to control an air pressure within the compressor 14. It is understood that alternately, the hydraulic accessory 34 may be any other suitable type of hydraulically actuable accessory 34 including, but not limited to, an actuator for an inlet guide vane (IGV), a bleed-off valve (BOV), and a bleed control valve (BCV).

Referring to FIG. 2, a fluid system in accordance with particular embodiments is shown at 100, and is configured to provide fluid to actuate the hydraulic accessory 34. The fluid system 100 may be used to carry either fuel or lubricant depending on its configuration; the fluid system 100 has a first supply line 102a, 102b, the primary function of which is feeding fluid to one or more component(s) 104 of the engine 10. In one embodiment, the first supply line is the main fuel supply line 102b of the fuel circulation system 30; in another embodiment, the first supply line is the main lubricant supply line 102a of the lubricant circulation system 32.

In the embodiment shown, the first supply line 102a, 102b is fluidly connected to a reservoir 106 which contains the fluid, and is also fluidly connected to the component(s) 104. When the first supply line is the main fuel supply line 102b, the component(s) 104 may include the fuel nozzles 16a; when the first supply line is the main lubricant supply line 102a, the component(s) 104 may include the bearing(s) 22 and/or the gearbox 26.

The first supply line 102a, 102b includes a fluid control unit 114 between the reservoir 106 and the component 104, so as to regulate the pressure of the fluid being provided to the component 104. The fluid control unit 114 may include any suitable element(s) allowing control of a pressure and/or flow of fluid through the first supply line 102a, 102b, including, but not limited to, a pump and a suitable controller 104.

The fluid system 100 further includes a second, or accessory, supply line 110 fluidly connecting an inlet 34a of the hydraulic accessory 34 to the first supply line 102a, 102b. The second supply line 110 is connected to the first supply line 102a, 102b upstream of the component 104. The second supply line 110 is connected to the first supply line 102a, 102b such that the fluid control unit 114 also regulates the pressure of the fluid being provided to the second supply line 110, such that the second supply line 110 is a regulated supply line. In the embodiment shown, the second supply line 110 is fluidly connected to the first supply line 102a, 102b via the fluid control unit 114.

Accordingly, the fluid control unit 114 (e.g. pump with controller) is configured to drive a flow of the fluid through the first supply line 102a, 102b and from the first supply line 102a, 102b through the second supply line 110. The fluid control unit 114 drives and controls the flow toward the component 104 via the first supply line 102a, 102b and toward the hydraulic accessory 34 via the second supply line 110.

Some kind of hydraulic accessories 34 such as surge control valves are operated at a high speed, for example taking about 0.5 second to move from a fully closed position to a fully opened position. Therefore, rapid actuation of the hydraulic accessory 34 might create a pressure drop in the fluid system 100 that might impair performance and/or capability of the component(s) 104. For instance, when the first supply line is the main fuel supply line 102b and the component(s) 104 include the fuel nozzles 16a, the pressure drop might result in an abrupt reduction of fuel flow to the fuel nozzles 16a and hence in a momentary reduction or interruption of a combustion process, which might lead to a drop in a thrust generated by the engine 10. When the first supply line is the main lubricant supply line 102a and the component(s) 104 include the bearings 22 and/or gearbox 26, the pressure drop might result in a momentary reduction or interruption of lubrication, which might lead to an increase in temperature and/or wear of the component. This might lead to premature deterioration of the component 104.

Accordingly, the fluid system 100 includes a hydraulic accumulator 108, referred to herein as an accumulator 108, which in a particular embodiment prevents this pressure drop in the feed to the component 104. The accumulator 108 includes a reservoir 108a fluidly connected to the second supply line 110 upstream of the inlet 34a of the hydraulic accessory 34, and independently of the first supply line 102a, 102b. The fluid communication between the reservoir 108a and the second supply line 110 is selective, i.e. it can be selectively opened and closed using any suitable type of mechanism, e.g. valve. The reservoir 108a has a volume varying between a minimum and a maximum volume, and the accumulator 108 includes any suitable type of actuation mechanism biasing the reservoir 108a toward the minimum volume. The actuation mechanism depends on the type of accumulator; for example, the accumulator 108 may be a piston type accumulator, which may be actuated by springs 108b, a reference pressure, or any other suitable type of actuation mechanism; it is however understood that the accumulator 108 may be of any suitable type of hydraulic accumulator and have any suitable configuration, including any suitable type of actuation mechanism.

In the embodiment shown, the reservoir 108a of the accumulator 108 is fluidly connected to the second supply line 110 via an auxiliary supply line 120, which is fluidly connected to the second supply line 110 between the inlet 34a of the hydraulic accessory 34 and a junction point 112 between the first and second supply lines 102a, 102b, 110. In the embodiment shown, the auxiliary supply line 120 is connected to the second supply line 110 between the inlet 34a of the hydraulic accessory 34 and the fluid control unit 114.

The reservoir 108a of the accumulator 108 contains a given quantity of the fluid, and is operable to deliver at least part of the given quantity of the fluid to the hydraulic accessory 34 when required, as the volume of the reservoir 108a is reduced toward the minimum volume. In a particular embodiment, the reservoir 108a contains the fluid at a given pressure such that the fluid is immediately available for operation of the hydraulic accessory 34. In a particular embodiment, the maximum volume of the reservoir 108a is selected so that the reservoir 108a may contain the quantity of fluid required for a single actuation of the hydraulic accessory 34; such a configuration is appropriate when the hydraulic accessory 34 has a rest period between actuations sufficiently long to allow the reservoir 108a to be refilled between each actuation, for example for a surge control valve having at least 12 seconds between each actuation. In another embodiment, the maximum volume of the reservoir 108a is selected so that the reservoir 108a may contain the quantity of fluid required for multiple actuations; such configuration is appropriate when the hydraulic accessory 34 is required to be actuated several times within a time period that is short when compared to the time required for actuation, for example when the hydraulic accessory 34 is an actuator for inlet guide vanes.

Accordingly, the accumulator 108 is operable to fill the reservoir 108a with fluid flowing from the first supply line 102a, 102b, into the second supply line 110, then into the auxiliary supply line 120, before reaching the reservoir 108a. The accumulator 108 is also operable to deliver at least part of the fluid contained in the reservoir 108 to the hydraulic accessory 34 for its actuation, the fluid flowing from the reservoir 108 into the auxiliary supply line 120 and then into the second supply line 110 before reaching the inlet 34a of the hydraulic accessory 34. In a particular embodiment, the fluid system 100 having the accumulator 108 on the second supply line 110 allows for quick control of the hydraulic accessory 34 without resulting in a pressure drop in the fluid provided to the component 104 by the first supply line 102a, 102b.

In the illustrated embodiment, the fluid system 100 includes a return line 116 for returning the fluid that is used by the hydraulic accessory 34 for further use in the fluid system 100. The return line 116 is fluidly connected to an outlet 34b of the hydraulic accessory 34, and fluidly connected to the first supply line 102a, 102b upstream of the component 104, such that the fluid used for actuation of the hydraulic accessory 34 can be provided to the component 104 after use. In the embodiment shown, the return line 116 is fluidly connected to the first supply line 102a, 102b via the fluid control unit 114.

In a particular embodiment where the first supply line is the main lubricant supply line 102a, the lubricant delivered to the component 104 is scavenged and rerouted toward the reservoir 106 to be recirculated. Therefore, the fluid system 100 includes a scavenge line 122 that fluidly connects an outlet of the component 104 (e.g. an outlet of a scavenging portion of the bearing cavity 24 or of the casing of the gearbox 26) to the reservoir 106 such that the lubricant may be reused; although not shown, the scavenge line 122 may include one or more suitable cooler(s) to cool the used lubricant, one or more suitable filter(s), etc. Flow through the scavenge line 122 may be driven by gravity of by any suitable system (e.g. scavenge pump).

In use and in a particular embodiment, the hydraulic accessory 34 is actuated by flowing fluid (e.g. fuel or lubricant) in the first supply line 102a, 102b feeding the component 104, and flowing a portion of the fluid circulating in the first supply line 102a, 102b in the second supply line 110 that is configured to feed the hydraulic accessory 34. A quantity of the portion of the fluid flowing in the second supply line 110 is extracted and stored, for example in the reservoir 108a of the accumulator 108. The accessory 34 is hydraulically actuated by releasing at least part the extracted quantity of the fluid from storage into the second supply line 110.

In a particular embodiment, the accessory 34 is hydraulically actuated by feeding fluid to the hydraulic accessory 34 from both the accumulator 108 and the first supply line 102a, 102b via the second supply line 110. The accumulator 108 can thus supplement the fluid pressure obtained from the first supply line 102a, 102b. In another embodiment, the hydraulic accessory 34 is actuated only by the accumulator 108.

In a particular embodiment, the first supply line is the main fuel supply line 102b of the engine 10 and feeding fluid to the component 104 via the first fluid supply line includes feeding fuel to one or more fuel nozzle(s) 16a.

In a particular embodiment, the first supply line is the main lubricant supply line 102a of the engine 10 and feeding fluid to the component 104 via the first fluid supply line includes feeding lubricant to the bearing cavity 24 and/or gearbox 26.

In a particular embodiment, having the accumulator 108 connected to the second supply line 110 allows for the reduction of hydraulic perturbations in the first supply line 102a, 102b, such that the performance and/or capability of the engine 10 is less affected by actuation of the hydraulic accessory 34, compared for example to a configuration where the accumulator 108 is directly connected to the first supply line 102a, 102b. In a particular embodiment, having the accumulator 108 connected to the second supply line 110 allows the accumulator 108 to provide a required flow upholding capability while reducing its pressure operating range, compared for example to the configuration where the accumulator 108 is directly connected to the first supply line 102a, 102b Reducing the pressure operating range of the accumulator 108 might allow a reduction in size of the accumulator 108, a reduction of a volume of its reservoir 108a, and/or a reduction of a length of its stroke in the case of a piston accumulator.

In a particular embodiment, the fluid system 100 with the accumulator 108 helps improve a transient response of a twin spool gas turbine engine when operated under transient conditions where the hydraulic accessory 34 can otherwise adversely affect the performance and/or capability of the engine.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A fluid system for a combustion engine, comprising:
a first supply line configured for supplying a fluid to a bearing or a gearbox of the engine, the first supply line being a main lubricant supply line of the engine;
a hydraulic accessory actuable by the fluid;
a second supply line fluidly connecting an inlet of the hydraulic accessory to the first supply line, the second supply line connected to the first supply line upstream of the bearing or the gearbox; and
an accumulator including a reservoir having a volume varying between a minimum and a maximum volume and an actuation mechanism biasing the reservoir toward the minimum volume, the reservoir in selective fluid communication with the second supply line upstream of the inlet of the hydraulic accessory;
wherein the hydraulic accessory is a surge control valve of a compressor of the combustion engine, the surge control valve actuatable by the fluid to control an air pressure within the compressor.

2. The fluid system of claim 1, wherein a return line fluidly connected to an outlet of the hydraulic accessory is fluidly connected to the first supply line.

3. The fluid system of claim 1, wherein the reservoir of the accumulator is fluidly connected to the second supply line via an auxiliary supply line, the auxiliary supply line fluidly connected to the second supply line at a location between the inlet of the hydraulic accessory and a junction between the first and second supply lines.

4. The fluid system of claim 1, wherein the first supply line includes a fluid control unit configured to regulate a pressure of the fluid in the first supply line, the second supply line fluidly connected to the first supply line via the fluid control unit.

5. The fluid system of claim 4, wherein the fluid control unit includes a pump.

6. The fluid system of claim 4, wherein a return line fluidly connected to an outlet of the hydraulic accessory is fluidly connected to the first supply line via the fluid control unit.

7. A fluid system for a combustion engine, comprising:
a first supply line configured for supplying a fluid to a component of the engine;
a hydraulic accessory actuable by the fluid, wherein the hydraulic accessory is a surge control valve of a compressor of the combustion engine, the surge control valve actuatable by the fluid to control an air pressure within the compressor;
a second supply line fluidly connecting an inlet of the hydraulic accessory to the first supply line, the second supply line connected to the first supply line upstream of the component; and
an accumulator including a reservoir having a volume varying between a minimum and a maximum volume and an actuation mechanism biasing the reservoir toward the minimum volume, the reservoir in selective fluid communication with the second supply line upstream of the inlet of the hydraulic accessory.

8. The fluid system of claim 7, wherein a return line fluidly connected to an outlet of the hydraulic accessory is fluidly connected to the first supply line.

9. The fluid system of claim 7, wherein the reservoir of the accumulator is fluidly connected to the second supply line via an auxiliary supply line, the auxiliary supply line fluidly connected to the second supply line at a location between the inlet of the hydraulic accessory and a junction between the first and second supply lines.

10. The fluid system of claim 7, wherein the first supply line is a main fuel supply line of the engine and the component is a fuel nozzle.

11. The fluid system of claim 7, wherein the first supply line includes a fluid control unit configured to regulate a pressure of the fluid in the first supply line, the second supply line fluidly connected to the first supply line via the fluid control unit.

12. The fluid system of claim 11, wherein the fluid control unit includes a pump.

13. The fluid system of claim 11, wherein a return line fluidly connected to an outlet of the hydraulic accessory is fluidly connected to the first supply line via the fluid control unit.

14. The fluid system of claim 7, wherein the first supply line is a main lubricant supply line of the engine and the component is a bearing or a gearbox.

* * * * *